July 23, 1968      J. N. BANYAI      3,393,596
LATHE ATTACHMENT FOR POWERING A HAND HACKSAW
Filed Oct. 25, 1966
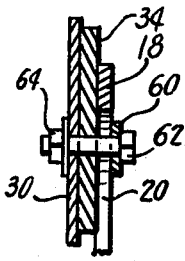
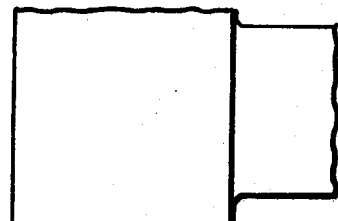
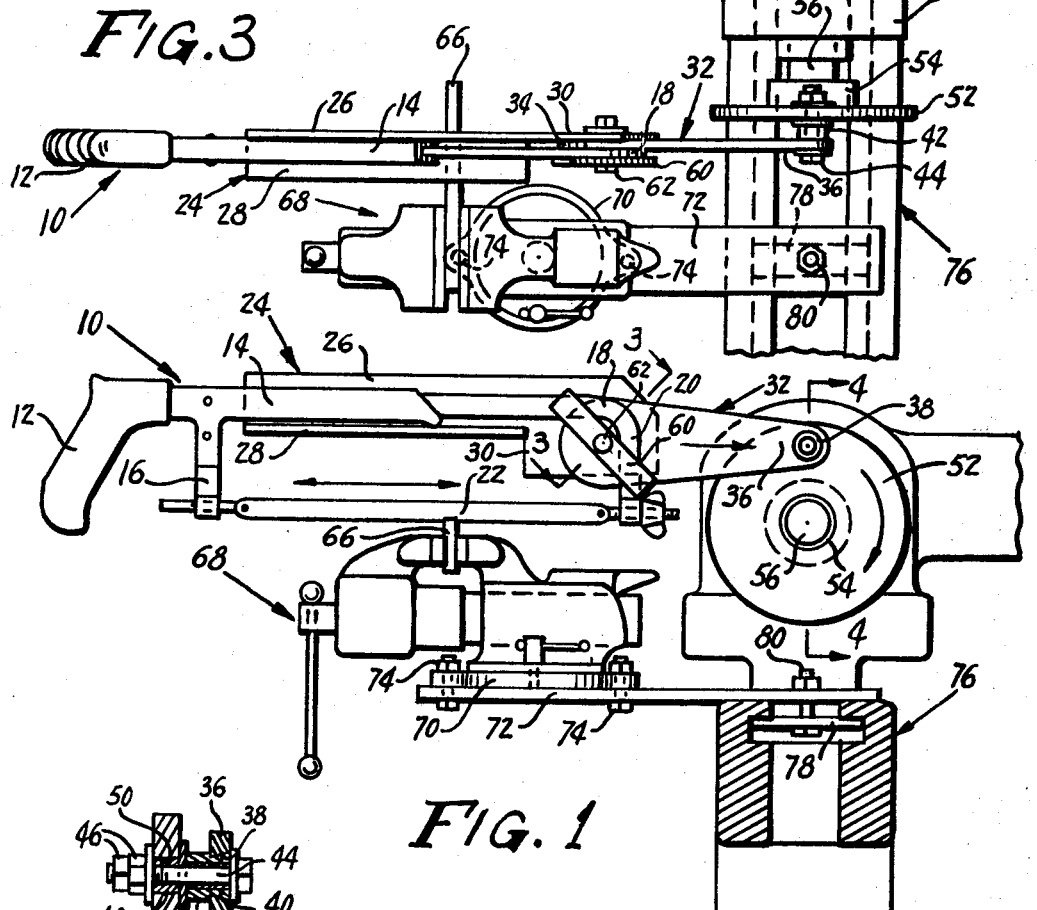
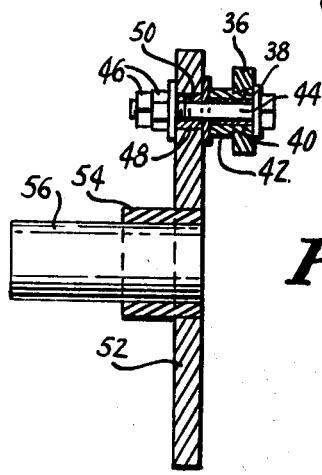
INVENTOR.
JOHN N. BANYAI
BY *Kimmel, Crowell & Weaver*
ATTORNEYS.

United States Patent Office 3,393,596
Patented July 23, 1968

3,393,596
LATHE ATTACHMENT FOR POWERING A HAND HACKSAW
John N. Banyai, 3176 Normington Drive, Sacramento, Calif. 95833
Filed Oct. 25, 1966, Ser. No. 589,379
10 Claims. (Cl. 83—647)

ABSTRACT OF THE DISCLOSURE

A lathe attachment for powering a hand hacksaw, which attachment includes glide means for supporting the hacksaw on the workpiece after the workpiece has been cut through by the saw blade.

---

This invention relates to an attachment for lathes for powering a hand hacksaw. More specifically, this invention relates to an attachment for converting rotary movement of a lathe chuck to reciprocal movement of a hand hacksaw interconnected with the lathe chuck.

Fully powered hacksaws having reciprocable movement are known in the prior art. Such hacksaws, however, generally are built as single purpose power tools. Hacksaws of this type are quite satisfactory for use in industrial shops and in machine shops generally where large amounts of metals are being cut. Indeed, such single purpose reciprocable hacksaws, as are known in the prior art, probably have significant advantages over the hacksaw to be described hereinafter for heavy industrial shops; however, for individuals who have neither the need nor the budget for such expensive single purpose reciprocable hacksaws, the devices of the prior art are most unsatisfactory. Not infrequently either individual hobbyists, small machine shops, instrument shops and the like, have need of a lathe and perhaps a few other power tools but do not need and cannot afford single purpose tools for each operation. While attempts have been made in the prior art to solve the problem facing such individuals by providing multipurpose power tools, such multipurpose power tool sets frequently have the disadvantage that the entire set must be acquired together in order to acquire the working facility of the multipurpose tools. Accordingly, it is a purpose and an object of this invention to provide an attachment which may be adapted to and powered by any conventional lathe for reciprocably driving a hand hacksaw.

An object of this invention, also, is the provision of an economical attachment which may be used by an individual hobbyist, an operator of a small machine or instrument shop without the investment of large sums of capital for single purpose tools or for a set of multipulpose tools.

An additional object of this invention is the provision of a lathe attachment which may be attached to and operated by any conventional lathe.

An additional object of the present invention is the provision of a combination of a lathe powered hand hacksaw and a lathe supported device for holding and cutting a workpiece.

The provision of specific structures and mechanisms as described in the specification which follows and as shown in the drawings is a further object of the present invention.

In the drawing:
FIGURE 1 is a side elevational view of the invention described hereinafter and its combinational aspects;
FIGURE 2 is a top plan view of the invention;
FIGURE 3 is an enlarged cross-sectional view of the means for connecting a hand hacksaw to a crank arm taken substantially along lines 3—3 of FIGURE 1;
FIGURE 4 is a cross-sectional detail view of a means for connecting a crank arm to a rotary disk taken substantially along lines 4—4 of FIGURE 1.

With reference now to FIGURES 1 and 2, the present invention comprises a hand hacksaw shown generally at 10 which includes a handle 12, an extensible yoke 14, the bight portion thereof being extensible, with a first arm 16 extending downwardly adjacent the handle and an intersecting portion 18 between the bight portion and the second arm 20 which extends downwardly a spaced distance from the first arms 16. A saw blade 22 is connected between arms 16 and 20 in the conventional manner.

An important feature of this invention is the saw support member 24 which comprises an elongate guide portion or member 26 which is secured adjacent to and extending parallel to the bight portion of the hand hacksaw. Substantially coextensive with the elongate guide member is an elongate glide member 28 which is in the form of an elongate planar member secured substantially at right angles to the bottom of the elongate guide member and substantially coextensive therewith and extends under the bight portion of the hand hacksaw. This glide member 28 performs an important function which will be described hereinafter. An attaching plate 30 which is coplanar with the elongate glide member and extends downwardly therefrom proximate one end of the glide member comprises a part of means for connecting the hand hacksaw to a crank arm 32. Crank arm 32 comprises an attaching plate portion 34 which cooperates with attaching plate 30 for connecting the distal end of the crank arm 32 to the hand hacksaw. Crank arm 32 also comprises an eccentric connector portion 36 having an aperture 38 therein.

Reference is now made to FIGURE 4 which shows the eccentric connector portion 36 of crank arm 32 in greater detail. Aperture 38 and a bearing 40 which may be an Oilite bearing therein. Oilite is an oil impregnated bronze bearing. Eccentric connector portion 36 is connected by a spacer 42, a bolt 44 with nuts 46, through a grommet 48 and aperture 50 to disk 52. Disk 52 is secured through sleeve 54 to shaft 56. As shown in FIGURES 2 and 4, shaft 56 is secured centrally of the disk for securing engagement by lathe chuck 58.

As is shown best in FIGURE 1, the rotary movement of disk 52 by lathe chuck 58 is converted to reciprocable linear movement through crank arm 32 which is secured eccentrically to the disk for relative rotational movement about the point of securement thereto. The distal end of crank arm 32 is frictionally secured to the attaching plate and to the hand hacksaw by an attaching bar 60 and a bolt 62 which is tightened by nut 64, shown best in FIGURE 3.

Referring again to FIGURES 1 and 2, workpiece 66 may be conveniently held in vice 68, which may be of any conventional design, and which is secured by its base plate 70 to an extension support bar 72 by means of bolts 74. The proximate end of extension support bar 72 is secured to the lathe bed, shown generally at 76, by a dog 78 and a bolt 80, in a conventional manner.

In operation, only a few seconds are required for attaching the vice to the lathe bed and for placing the workpiece therein. A few more seconds are required for attaching the hand hacksaw, through the rotary to linear motion conversion device including crank arm 32 to the lathe chuck. The hand hacksaw blade 22 is allowed to rest on workpiece 66 and the lathe is turned on. As the lathe chuck 58 rotates disk 52, the hand hacksaw moves reciprocably with plate 22 in contact with workpiece 66. When the workpiece 66 has been cut in two the hand hacksaw falls downwardly under the force of gravity and the workpiece is engaged by a glide member 28. Thus, even though an operator is not present, the hand hacksaw continues its reciprocal movement afforded by glide member 28. Possible injury to an operator or other person standing nearby and injury to the tools and the lathe is thereby avoided. This protective feature is a highly important and desirable object of the invention.

As will be apparent from the drawings and the specification, the attachment device of this invention may be very economically manufactured, requires no special tools for attachment or use, and may conveniently be used by anyone having a lathe of any conventional design.

It will also be realized that while the invention has been described with reference to highly specified structures in order to permit one skilled in the art to use and practice the invention, the embodiments shown in the drawings and described herein are merely exemplary and changes may be made in light of the teachings of the present specification and from the knowledge and skill expected of one in the art without departing from the spirit of the invention. The scope of the invention is limited only by the appended claims.

I claim:

1. Apparatus for powering a hand hacksaw with a lathe comprising:
    a rotary to linear motion conversion device including a crank arm for connection to a lathe chuck;
    means for connecting the distal end of the crank arm to the hand hacksaw for reciprocably moving the hacksaw when the lathe chuck is rotated; and
    a glide member secured to the connecting means for engaging a workpiece after the hacksaw has cut through the workpiece.

2. The apparatus of claim 1 wherein:
    the connecting means comprises:
        an elongate guide member for securement adjacent and extending parallel to the bight portion of the hand hacksaw, and
        an attaching plate coplanar with the elongate guide member and extending downwardly therefrom proximate one end thereof; and
    the glide member comprises:
        an elongate planar member secured substantially at right angles to the bottom of the elongate guide member and substantially coextensive therewith for extension under the bight portion of the hand hacksaw.

3. The apparatus of claim 1 wherein:
    the rotary to linear motion converting device comprises:
        a disk,
        a shaft secured centrally of the disk for securing engagement by the lathe chuck,
        a crank arm, and
        means securing the proximate end of the crank arm eccentrically to the disk for relative rotational movement about the point of securement to the disk.

4. The apparatus of claim 3 wherein:
    the connecting means comprises:
        an elongate guide member for securement adjacent and extending parallel to the bight portion of the hand hacksaw,
        an attaching plate coplanar with the elongate guide member and extending downwardly therefrom proximate one end thereof, and
        means for frictionally securing the attaching plate and the distal end of the crank arm to the hand hacksaw.

5. The apparatus of claim 4 wherein the glide member comprises an elongate planar member secured substantially at right angles to the bottom of the elongate guide member and substantially coextensive therewith for extension under the bight portion of the hand hacksaw.

6. In combination:
    a lathe having a chuck;
    a rotary to linear motion conversion device including a crank arm secured in the lathe chuck;
    a hand hacksaw;
    means connecting the distal end of the crank arm to the hand hacksaw for reciprocably moving the hacksaw when the lathe chuck is rotated; and
    a glide member secured to the connecting means for engaging a workpiece after the hacksaw has cut through the workpiece.

7. The combination of claim 6 further comprising:
    a vise for holding a workpiece to be cut by the hand hacksaw;
    an extension support member for supporting the vise in spaced relation from the bed of the lathe;
    means securing the vise to the distal end of the support member; and
    means securing the proximate end of the support member to the bed of the lathe.

8. The combination of claim 6 wherein:
    the connecting means comprises:
        an elongate guide member secured adjacent and extending parallel to the bight portion of the hand hacksaw, and
        an attaching plate coplanar with the elongate guide member and extending downwardly therefrom proximate one end thereof; and
    the guide member comprises:
        an elongate planar member secured substantially at right angles to the bottom of the elongate guide member and substantially coextensive therewith extending under the bight portion of the hand hacksaw.

9. The combination of claim 7 wherein:
    the rotary to linear motion converting device comprises:
        a disk,
        a shaft extending from the disk into the lathe chuck, said shaft being secured centrally of and coaxial with the disk for rotating the disk,
        a crank arm, and
        means securing the proximate end of the crank arm eccentrically to the disk for relative rotational movement about the point of securement to the disk.

10. The combination of claim 8 further comprising:
    a vise for holding a workpiece to be cut by the hand hacksaw;
    an extension support member for supporting the vise in spaced relation from the bed of the lathe;
    means securing the vise to the distal end of the support member; and
    means securing the proximate end of the support member to the bed of the lathe.

References Cited

UNITED STATES PATENTS

| | | | |
|---|---|---|---|
| 1,835,432 | 12/1931 | Samson | 83—574 X |
| 1,845,731 | 2/1932 | Stoddard | 83—647 X |
| 2,337,629 | 12/1943 | Shortell | 83—647 X |
| 2,686,351 | 8/1954 | Chandler | 83—647 X |

WILLIAM S. LAWSON, *Primary Examiner.*